(12) United States Patent
Wang et al.

(10) Patent No.: US 11,201,565 B2
(45) Date of Patent: Dec. 14, 2021

(54) CONVERSION CIRCUIT, CONTROL METHOD, AND POWER SUPPLY DEVICE

(71) Applicant: HUAWEI TECHNOLOGIES CO., LTD., Guangdong (CN)

(72) Inventors: Zhaohui Wang, Shanghai (CN); Lei Shi, Shanghai (CN); Dianbo Fu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/785,225

(22) Filed: Feb. 7, 2020

(65) Prior Publication Data

US 2020/0177100 A1 Jun. 4, 2020

Related U.S. Application Data

(63) Continuation of application No. PCT/CN2018/099926, filed on Aug. 10, 2018.

(30) Foreign Application Priority Data

Aug. 11, 2017 (CN) .......................... 201710686021.7

(51) Int. Cl.
*H02M 7/487* (2007.01)
*H02M 7/483* (2007.01)
(Continued)

(52) U.S. Cl.
CPC ............ *H02M 7/487* (2013.01); *H02J 3/381* (2013.01); *H02M 1/083* (2013.01);
(Continued)

(58) Field of Classification Search
CPC ...... H02M 7/483; H02M 7/487; H02M 7/515; H02M 7/5387; H02M 2007/4835;
(Continued)

(56) References Cited

U.S. PATENT DOCUMENTS 8,598,749 B2 12/2013 Lacarnoy
10,404,175 B2 * 9/2019 Chakraborty ....... H02M 3/1588
(Continued)

FOREIGN PATENT DOCUMENTS

CN 101018017 * 1/2007
CN 202172367 U 3/2012
(Continued)

OTHER PUBLICATIONS

Machine translation of CN-101018017-A, Jin Ke Ruan, Mixed three level resonance DC convertor and dual shift phase control method (Year: 2007).*

(Continued)

*Primary Examiner* — Sisay G Tiku
(74) *Attorney, Agent, or Firm* — Womble Bond Dickinson (US) LLP

(57) ABSTRACT

A conversion circuit is disclosed. In the conversion circuit, an input terminal includes a positive direct current bus terminal and a negative direct current bus terminal, and an output terminal includes an alternating current output end; a first switch unit includes a flying clamping capacitor and a first converter bridge arm; a second switch unit includes a second converter bridge arm; an output end of the first switch unit and the second switch unit is connected to the alternating current output end; and the first switch unit and the second switch unit are connected to a control module, and switch under control of the control module, so that the conversion circuit converts between a direct current voltage and an alternating current voltage, to output a required alternating current voltage.

18 Claims, 11 Drawing Sheets

(51) Int. Cl.
    *H02M 7/515* (2007.01)
    *H02M 7/5387* (2007.01)
    *H02M 3/07* (2006.01)
    *H02J 3/38* (2006.01)
    *H02M 1/08* (2006.01)
    *H02J 9/06* (2006.01)
    *H02M 1/00* (2006.01)

(52) U.S. Cl.
    CPC ........... *H02M 7/5387* (2013.01); *H02J 9/062* (2013.01); *H02J 2300/24* (2020.01); *H02M 1/0058* (2021.05); *H02M 7/4835* (2021.05)

(58) Field of Classification Search
    CPC .................. H02M 3/07; H02M 3/073; H02M 2001/0058; H02M 2007/4822
    See application file for complete search history.

(56) References Cited

U.S. PATENT DOCUMENTS

| | | | |
|---|---|---|---|
| 10,541,623 B1* | 1/2020 | Michal | H02M 7/483 |
| 10,903,758 B2* | 1/2021 | Fu | H02M 7/487 |
| 10,951,131 B2* | 3/2021 | Shi | H02J 3/381 |
| 2011/0013438 A1 | 1/2011 | Frisch et al. | |
| 2012/0218795 A1* | 8/2012 | Mihalache | H02M 7/487 |
| | | | 363/97 |
| 2013/0154716 A1 | 6/2013 | Degener et al. | |
| 2013/0272045 A1 | 10/2013 | Soeiro et al. | |
| 2015/0263644 A1* | 9/2015 | Fu | H02M 7/487 |
| | | | 363/95 |
| 2015/0333522 A1 | 11/2015 | Wang et al. | |
| 2017/0338748 A1* | 11/2017 | Liang | H02M 3/33569 |
| 2019/0058416 A1* | 2/2019 | Wang | H02M 7/487 |

FOREIGN PATENT DOCUMENTS

| | | |
|---|---|---|
| CN | 102664548 A | 9/2012 |
| CN | 103095168 A | 5/2013 |
| CN | 103236796 A | 8/2013 |
| CN | 204013248 U | 12/2014 |
| CN | 105811795 A | 7/2016 |
| CN | 107317508 A | 11/2017 |
| EP | 2590312 A1 | 5/2013 |
| EP | 2728734 A1 | 5/2014 |
| WO | 2015030152 A1 | 3/2015 |
| WO | 2017201373 A1 | 11/2017 |

OTHER PUBLICATIONS

M. Schweizer, T. Friedli and J. W. Kolar, "Comparative Evaluation of Advanced Three-Phase Three-Level Inverter/Converter Topologies Against Two-Level Systems," in IEEE Transactions on Industrial Electronics, vol. 60, No. 12, pp. 5515-5527, Dec. 2013.

XP010346808 Xiaoming Yuan et al., Investigation on the Clamping Voltage Self-Balancing of the Three-Level Capacitor Clamping Inverter ,30th Annual IEEE Power Electronics Specialists Conference. Record. (Cat. No. 99CH36321),dated Jul. 1, 1999,total 6 pages.

* cited by examiner

CONVERSION CIRCUIT, CONTROL METHOD, AND POWER SUPPLY DEVICE

CROSS-REFERENCE TO RELATED APPLICATIONS

This application is a continuation application of international patent application number PCT/CN2018/099926 filed on Aug. 10, 2018, which claims priority to Chinese Patent Application No. 201710686021.7, filed on Aug. 11, 2017. The disclosures of the aforementioned applications are hereby incorporated by reference in their entireties.

TECHNICAL FIELD

This application relates to the field of photovoltaic power generation technologies, and in particular, to a conversion circuit, a control method, and a power supply device.

BACKGROUND

In a photovoltaic power generation system, an inverter as a core device directly determines a system architecture and reliable operation of a photovoltaic power station. A high-efficiency inverter can increase electric energy production of the photovoltaic power generation system, reduce a weight and a size of a converter, facilitate installation and maintenance, and improve product cost performance and enhance product market competitiveness. As a core part of a photovoltaic inverter, an inverter circuit has a crucial effect on overall performance of the inverter.

To implement high-efficiency electric energy conversion, deep exploration and research are performed on inverter circuits in industry and academia. Currently, commonly used inverter circuits mainly include a two-level inverter circuit and a three-level inverter circuit. As shown in FIG. 1, FIG. 1a shows a conventional bridge-type two-level inverter circuit, and FIG. 1b shows a diode neutral point clamped (NPC) three-level inverter circuit.

The conventional two-level inverter circuit and the NPC three-level inverter circuit have different loss characteristics. When total losses of the two circuits are close to each other, the two-level inverter circuit has a lower conduction loss than the three-level inverter circuit, while the NPC three-level inverter circuit has a lower switching loss than the two-level inverter circuit. This is because in the three-level inverter circuit, low-voltage semiconductor switching devices may be used, and the low-voltage devices have excellent switching characteristics and low switching losses. However, these devices need to be connected in series to reach a voltage grade of the two-level circuit, and series connection of these devices causes a relatively high forward conduction voltage drop. The curves shown in FIG. 2 indicate that when forward currents of devices are the same, a conduction voltage drop (V1) of a 1200 V IGBT is obviously lower than a conduction voltage drop (V2) of two 650 V IGBTs connected in series. Therefore, the two-level circuit can achieve a lower conduction loss.

In conclusion, the two-level inverter circuit has a low conduction loss, while a multilevel inverter circuit has a low switching loss. Therefore, to further reduce a loss of a converter and increase power density and product competitiveness of the converter, advantages of the two types of inverter circuits can be comprehensively used in an inverter, to improve converter performance.

However, in a circuit obtained by combining a two-level inverter circuit with an NPC three-level inverter circuit, there are a large quantity of semiconductor devices, a commutation loop is complex, and a power circuit layout is affected. In addition, in a topology of the combined circuit, capacitors with large capacity need to be used to divide direct current bus voltage to generate a midpoint voltage. However, serious voltage fluctuation occurs on the midpoint voltage, and the voltage fluctuation leads to an increase in an amplitude value of a current ripple of a bus capacitor, causing the bus capacitor to generate heat, reducing a service life of the capacitor, and affecting long-term reliable working of the converter.

SUMMARY

This application provides a conversion circuit, where the circuit belongs to a mixed type three-level inverter circuit topology. Based on this, this application further provides a control method matching the circuit, so as to reduce a loss of a converter and improve converter performance.

According to a first aspect, this application provides a conversion circuit, where the circuit includes an input terminal, an output terminal, a control module, and a first switch unit and a second switch unit that are formed by semiconductor switching devices; the input terminal includes a positive direct current bus terminal and a negative direct current bus terminal, and the output terminal includes an alternating current output end; the first switch unit includes a flying clamping capacitor and a first converter bridge arm that is formed by connecting a first switch, a second switch, a third switch, and a fourth switch in series, where two ends of the first converter bridge arm are respectively connected to the positive direct current bus terminal and the negative direct current bus terminal, a first end of the flying clamping capacitor is connected to a series connection point between the first switch and the second switch, a second end of the flying clamping capacitor is connected to a series connection point between the third switch and the fourth switch, and a series connection point between the second switch and the third switch forms an output end of the first switch unit; the flying clamping capacitor is configured to implement voltage clamping of the second switch and the third switch, to avoid overvoltage damage of the switch devices; the second switch unit includes a second converter bridge arm that includes a fifth switch and a sixth switch, two ends of the second converter bridge arm are respectively connected to the positive direct current bus terminal and the negative direct current bus terminal, and a series connection point between the fifth switch and the sixth switch is connected to the alternating current output end; and the first switch unit and the second switch unit are connected to the control module; and switch under control of the control module, so that the conversion circuit converts between a direct current voltage and an alternating current voltage.

With reference to the first aspect, in an implementation of the first aspect, the circuit further includes a filtering module, configured to filter out a ripple of a voltage of the output end of the first switch unit and the second switch unit, where one end of the filtering module is connected to the output end of the first switch unit and the second switch unit, and the other end of the filtering module is connected to the alternating current output end. Optionally, the filtering module includes a filter circuit such as an inductor.

With reference to the first aspect, in another implementation of the first aspect, the first switch, the second switch, the third switch, the fourth switch, the fifth switch, and the sixth switch each include a semiconductor switching device such as an IGBT or a MOSFET device, and the IGBT includes an anti-parallel diode.

With reference to the first aspect, in still another implementation of the first aspect, the first switch, the second switch, the third switch, and the fourth switch each include an IGBT and an anti-parallel diode, and the fifth switch and the sixth switch each include a semiconductor switching device such as an IGBT or a MOSFET.

With reference to the first aspect, in still another implementation of the first aspect, the circuit may be a part of a single-phase circuit, a three-phase circuit, or a multiphase circuit.

With reference to the first aspect, in still another implementation of the first aspect, the circuit is a part of a rectifying circuit or an inverter circuit.

With reference to the first aspect, in still another implementation of the first aspect, a steady state voltage of the flying clamping capacitor is usually controlled at ½ of a direct current bus voltage, that is, Vbus/2, and based on driving logic, output levels of the output end OUT of the first switch unit and the second switch unit relative to a direct current bus midpoint M are +Vbus/2, 0, and −Vbus/2.

According to a second aspect, this application further provides a control method, used to control the conversion circuit described in the first aspect, where the conversion circuit includes an input terminal, an output terminal, a control module, and a first switch unit and a second switch unit that are formed by semiconductor switching devices; the input terminal includes a positive direct current bus terminal and a negative direct current bus terminal, and the output terminal includes an alternating current output end; the first switch unit includes a flying clamping capacitor and a first converter bridge arm that is formed by connecting a first switch, a second switch, a third switch, and a fourth switch in series, where two ends of the first converter bridge arm are respectively connected to the positive direct current bus terminal and the negative direct current bus terminal, a first end of the flying clamping capacitor is connected to a series connection point between the first switch and the second switch, a second end of the flying clamping capacitor is connected to a series connection point between the third switch and the fourth switch, and a series connection point between the second switch and the third switch forms an output end of the first switch unit; the second switch unit includes a second converter bridge arm that includes a fifth switch and a sixth switch, two ends of the second converter bridge arm are respectively connected to the positive direct current bus terminal and the negative direct current bus terminal, and a series connection point between the fifth switch and the sixth switch is connected to an output end of the second switch unit; the output end of the first switch unit and the second switch unit are connected to the alternating current output end; the control module is connected to the first switch unit and the second switch unit, is configured to control switch-on or switch-off of each switch device in the switch units to implement power conversion between a direct current voltage and an alternating current voltage; the circuit control method includes: controlling, by the control module within a time in which both the first switch and the second switch are on, the fifth switch to be on for at least a period of time, to reduce a conduction voltage drop of a path of the first switch and the second switch; and controlling, by the control module within a time in which both the third switch and the fourth switch are on, the sixth switch to be on for at least a period of time, to reduce a conduction voltage drop of a path of the third switch and the fourth switch.

In the control method provided in this aspect, because an on-state voltage drop of the fifth switch is lower than a voltage drop obtained after the first switch and the second switch are connected in series, and an on-state voltage drop of the sixth switch is lower than a voltage drop obtained after the third switch and the fourth switch are connected in series, switch-on of the fifth switch and the sixth switch may cause a decrease in a conduction voltage drop in a current flowing loop, thereby reducing a conduction loss of a converter.

With reference to the second aspect, in an implementation of the second aspect, a switching frequency of each of the four switches in the first switch unit is a high frequency, and the first switch and the fourth switch are complementary switches; the second switch and the third switch are complementary switches; switching cycles of the four switches in the first switch unit are the same; and the fifth switch and the sixth switch are complementary switches.

With reference to the second aspect, in another implementation of the second aspect, the first switch and the second switch in the first switch unit are switched on/off with a phase shift of 180°, and the third switch and the fourth switch are switched on/off with a phase shift of 180°.

With reference to the second aspect, in still another implementation of the second aspect, the controlling, by the control module within a time in which both the first switch and the second switch are on, the fifth switch to be on for at least a period of time includes: when the first switch is off and the second switch is on, when the first switch is switched on, controlling, by the control module, the fifth switch to be switched on a time interval Td1 later than a switch-on moment of the first switch, so as to implement zero voltage switch-on of the fifth switch, so that the fifth switch has no switching-on loss; when both the first switch and the second switch are on, when the second switch is to be switched off, controlling, by the control module, the fifth switch to be switched off a time interval Td2 earlier than a switch-off moment of the second switch, where the second switch is used to implement switching-off commutation and implement zero voltage switch-off of the fifth switch, so that the fifth switch has no switching-off loss; when the first switch is on and the second switch is off, when the second switch is switched on, controlling, by the control module, the fifth switch to be switched on a time interval Td3 later than a switch-on moment of the second switch, where the second switch is used to implement switching-on commutation and implement zero voltage switch-on of the fifth switch, so that the fifth switch has no switching-on loss; and when both the first switch and the second switch are on, when the first switch is to be switched off, controlling, by the control module, the fifth switch to be switched off a time interval Td4 earlier than a switch-off moment of the first switch, where the first switch is used to implement switching-off commutation and implement zero voltage switch-off of the fifth switch, so that the fifth switch has no switching-off loss.

With reference to the second aspect, in still another implementation of the second aspect, the controlling, by the control module within a time in which both the third switch and the fourth switch are on, the sixth switch to be on for at least a period of time includes: when the third switch is on and the fourth switch is off, when the fourth switch is switched on, controlling, by the control module, the sixth switch to be switched on a time interval Td5 later than a switch-on moment of the fourth switch, where the fourth switch is used to implement switching-on commutation and implement zero voltage switch-on of the sixth switch, so that the sixth switch has no switching-on loss; when both the third switch and the fourth switch are on, when the third switch is to be switched off, controlling, by the control module, the sixth switch to be switched off a time interval Td6 earlier than a switch-off moment of the third switch, where the third switch is used to implement switching-off commutation and implement zero voltage switch-off of the sixth switch, so that the sixth switch has no switching-off loss; when the third switch is off and the fourth switch is on, when the third switch is switched on, controlling, by the control module, the sixth switch to be switched on a time interval Td7 later than a switch-on moment of the third switch, where the third switch is used to implement switching-on commutation and implement zero voltage switch-on of the sixth switch, so that the sixth switch has no switching-on loss; when both the third switch and the fourth switch are on, when the fourth switch is to be switched off, controlling, by the control module, the sixth switch to be switched off a time interval Td8 earlier than a switch-off moment of the fourth switch, where the fourth switch is used to implement switching-off commutation and implement zero voltage switch-off of the sixth switch, so that the sixth switch has no switching-off loss.

With reference to the second aspect, in still another implementation of the second aspect, the method further includes: determining, by the control module, the time intervals based on switching characteristics of the switch devices in the first switch unit and the second switch unit, where the time interval is between 0 ns and 10 vs.

With reference to the second aspect, in another implementation of the second aspect, the method further includes: setting, by the control module, the time intervals solely, where the time interval is between 0 ns and 10 vs.

With reference to the second aspect, in another implementation of the second aspect, the circuit further includes a filtering module; one end of the filtering module is connected to the output end of the first switch unit and the second switch unit, and the other end of the filtering module is connected to the alternating current output end; and the filtering module is configured to filter out a ripple of a voltage of the output end of the first switch unit and the second switch unit.

According to a third aspect, this application further provides a power supply device, and the power supply device includes the conversion circuit described in the first aspect, and is configured to implement power conversion between a direct current voltage and an alternating current voltage. Further, the power supply device includes a converter, for example, an AC/DC converter and a DC/AC converter.

With reference to the third aspect, in an implementation of the third aspect, the device includes a processor and a memory, where the processor is configured to control switch-on or switch-off of each switch device in the conversion circuit, to implement power conversion between a direct current voltage and an alternating current voltage, and output a required alternating current voltage. The memory may store a program, and the program is used to perform the circuit control method in various implementations of the second aspect of this application.

According to a fourth aspect, this application further provides a photovoltaic power generation system, where the system includes a photovoltaic cell, a photovoltaic inverter, and an alternating current power grid; the photovoltaic inverter includes an input end, an output end, and the conversion circuit described in the foregoing first aspect or various implementations of the first aspect; the input end of the photovoltaic inverter is connected to the photovoltaic cell, and the output end of the photovoltaic inverter is connected to the alternating current power grid; and the conversion circuit is configured to convert voltages at the input end and the output end of the photovoltaic inverter. Optionally, the photovoltaic inverter is the power supply device described in the foregoing third aspect.

Compared with a mixed type NPC three-level inverter circuit or a mixed type active neutral point clamp (ANPC) three-level inverter circuit, the conversion circuit provided in this application implements electric energy conversion between a direct current and an alternating current by using a flying capacitor three-level circuit, to replace some diodes. This reduces a quantity of semiconductors, and simplifies a circuit structure is simplified, facilitating power module layout. In addition, due to use of the flying capacitor, a direct current bus does not need to use a large capacity capacitor for voltage division to generate a midpoint voltage, and therefore there is no problem of midpoint voltage fluctuation, a direct current bus capacitor structure is simplified, and a bus capacitor is saved.

In the circuit control method provided in this application, each switch of the first switch unit and the second switch unit is controlled to be switched on or off, so that the output end of the first switch unit and the second switch unit is alternately connected to the positive direct current bus terminal and the negative direct current bus terminal according to a preset switch-on/off time sequence, and commutation is implemented through switch-on or switch-off of the four switches in the first switch unit, and switch-on of the fifth switch and the sixth switch in the second switch unit causes a decrease in the conduction voltage drop of the current flowing loop, thereby reducing a conduction loss of the converter.

DESCRIPTION OF EMBODIMENTS

To make a person skilled in the art understand the technical solutions in the embodiments of the present disclosure better, and make the objectives, features, and advantages of the embodiments of the present disclosure clearer, the following further describes the technical solutions in the embodiments of the present disclosure in detail with reference to the accompanying drawings.

Figure 1A:
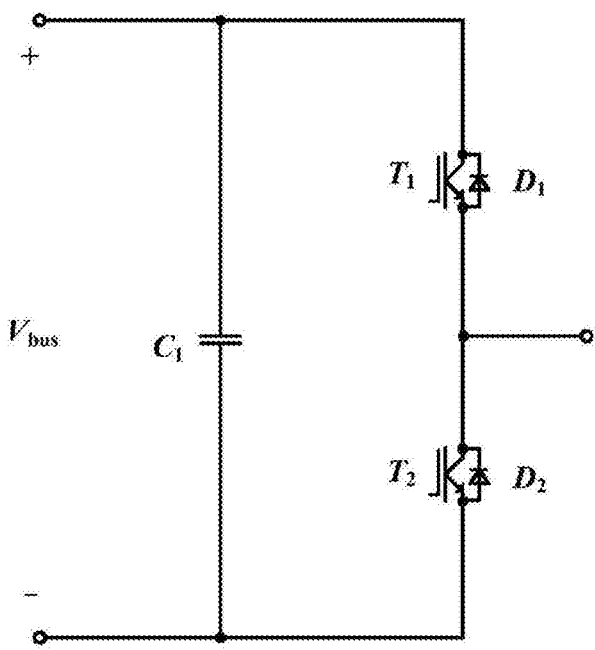
FIG. 1a is a schematic structural diagram of a conventional bridge-type two-level inverter circuit.
Figure 1B:
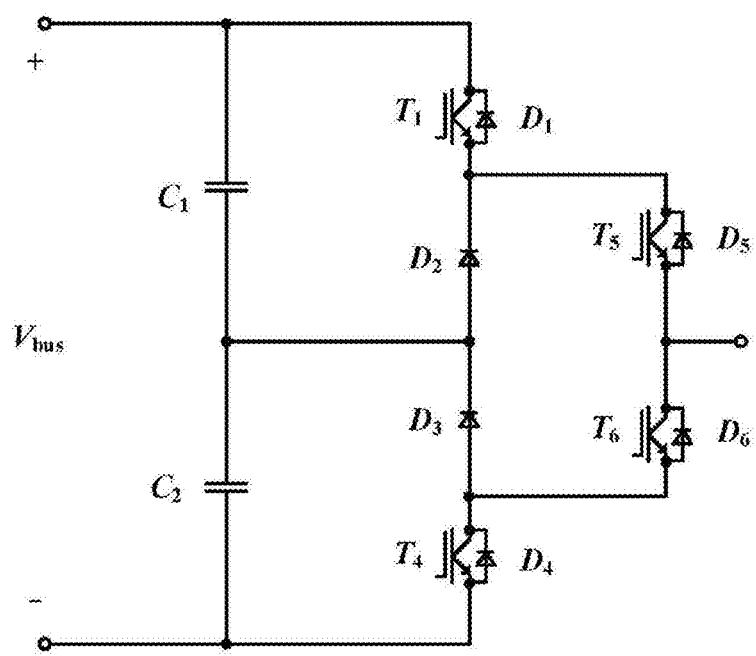
FIG. 1b is a schematic structural diagram of a diode neutral point clamped three-level inverter circuit.
Figure 2:
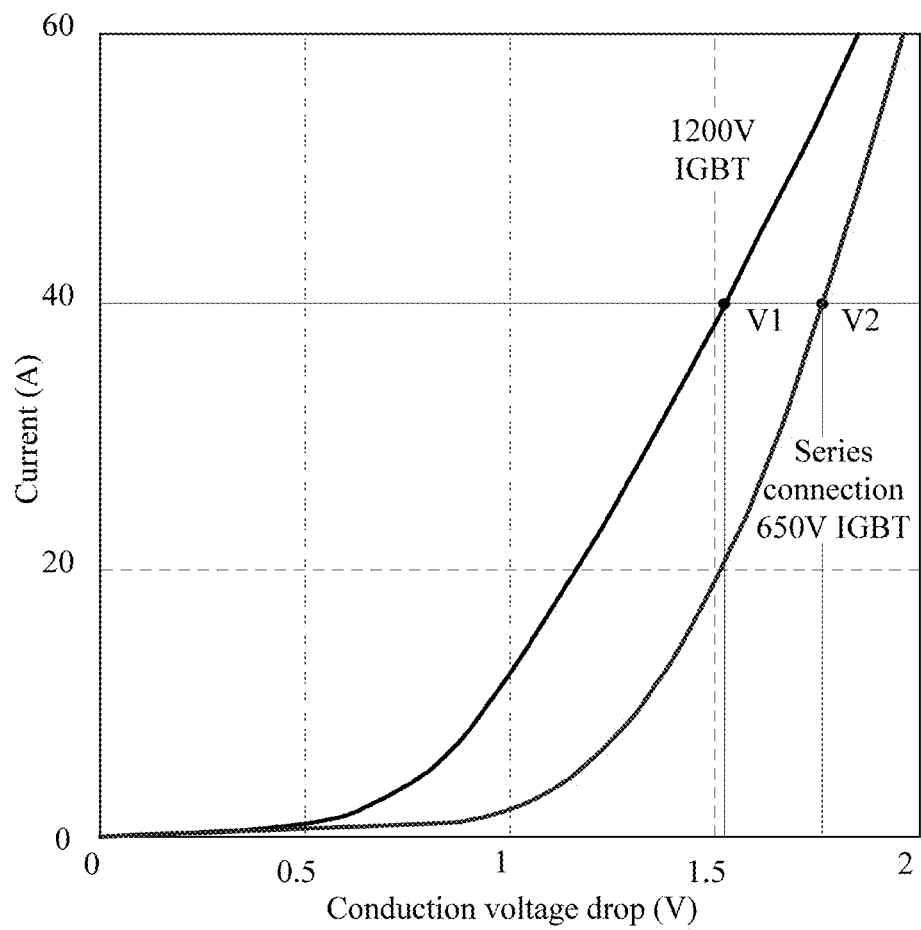
FIG. 2 is a schematic diagram of comparison between forward on-state voltage drops of IGBTs connected in series and a high voltage IGBT.
Figure 3:
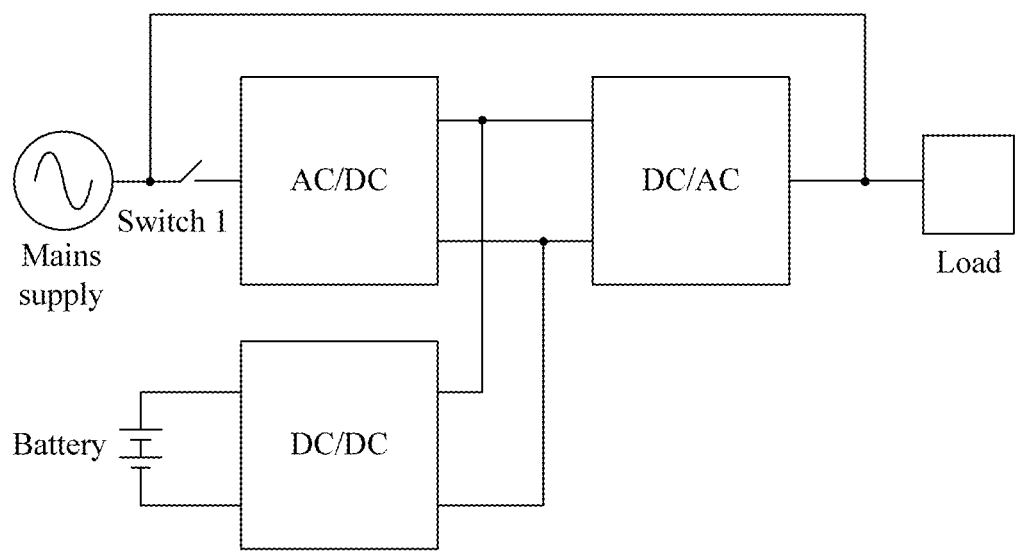
FIG. 3 is a schematic diagram of an application scenario of a converter in a UPS power supply system according to this application.
Figure 4:
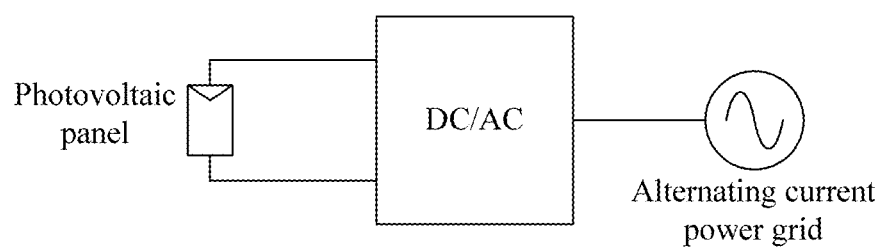
FIG. 4 is a schematic diagram of an application scenario of a converter in a grid-connected photovoltaic power generation system according to this application.

The present disclosure is intended to implement high-efficiency electric energy conversion between an alternating current (AC) and a direct current (DC). Before the technical solutions of the embodiments of the present disclosure are described, application scenarios of the embodiments of the present disclosure are first described with reference to the accompanying drawings. Common application scenarios are uninterruptible power supply (UPS), photovoltaic power generation, and the like. FIG. 3 is a schematic diagram of an application scenario of a converter in a UPS power supply system. In a normal case, power is directly supplied to a load through mains power, and industrial frequency alternating-current mains power can be converted to a direct current from an alternating current through an AC/DC converter, and a battery is charged through a DC/DC converter; and when a fault occurs on mains supply, a direct current in the battery is converted to an alternating current through the DC/DC converter and the DC/AC converter, to supply power to the load. FIG. 4 shows a grid-connected photovoltaic power generation system. A direct current output by a photovoltaic panel is converted to an alternating current through a DC/AC converter, so as to implement grid-connected power generation of the photovoltaic panel.

To further reduce a loss of a converter, and increase power density and product competitiveness of the converter, advantages of a two-level inverter circuit and an NPC three-level inverter circuit can be comprehensively used in an inverter, to improve converter performance.

Embodiment 1

Figure 5:
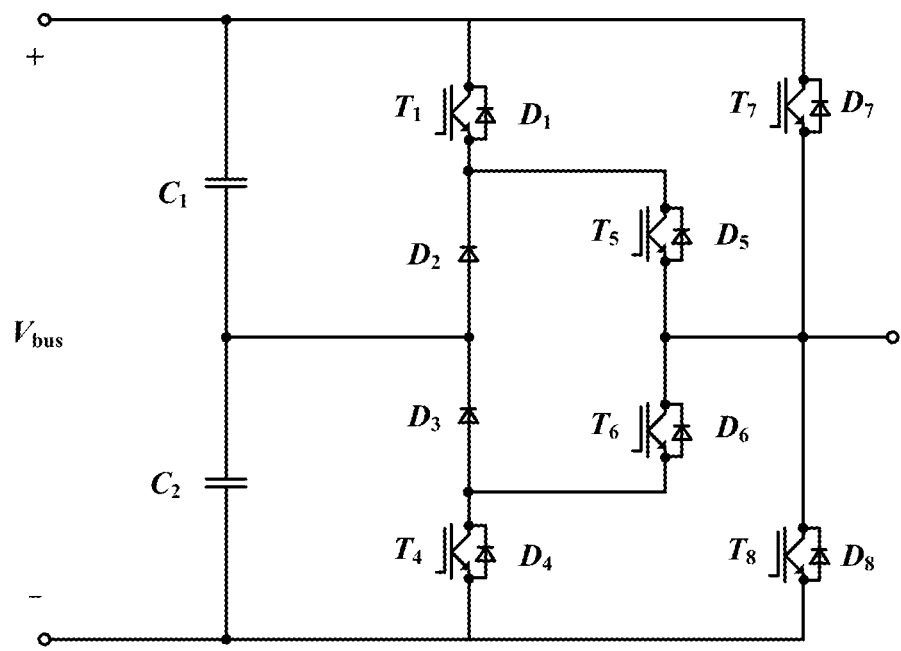
FIG. 5 is a topological diagram of a mixed type NPC three-level inverter circuit.

FIG. 5 is a topological diagram of a mixed type NPC three-level inverter circuit. A switch network in a topology of the circuit includes two parts, a left half part is an NPC three-level inverter circuit, and a right half part is a two-level inverter circuit. In the topology of the circuit, a low conduction loss characteristic of a conventional two-level inverter circuit and a low switching loss characteristic of an NPC three-level inverter circuit can be comprehensively used, so as to reduce an overall loss of a converter and improve converter performance.

Figure 6A:
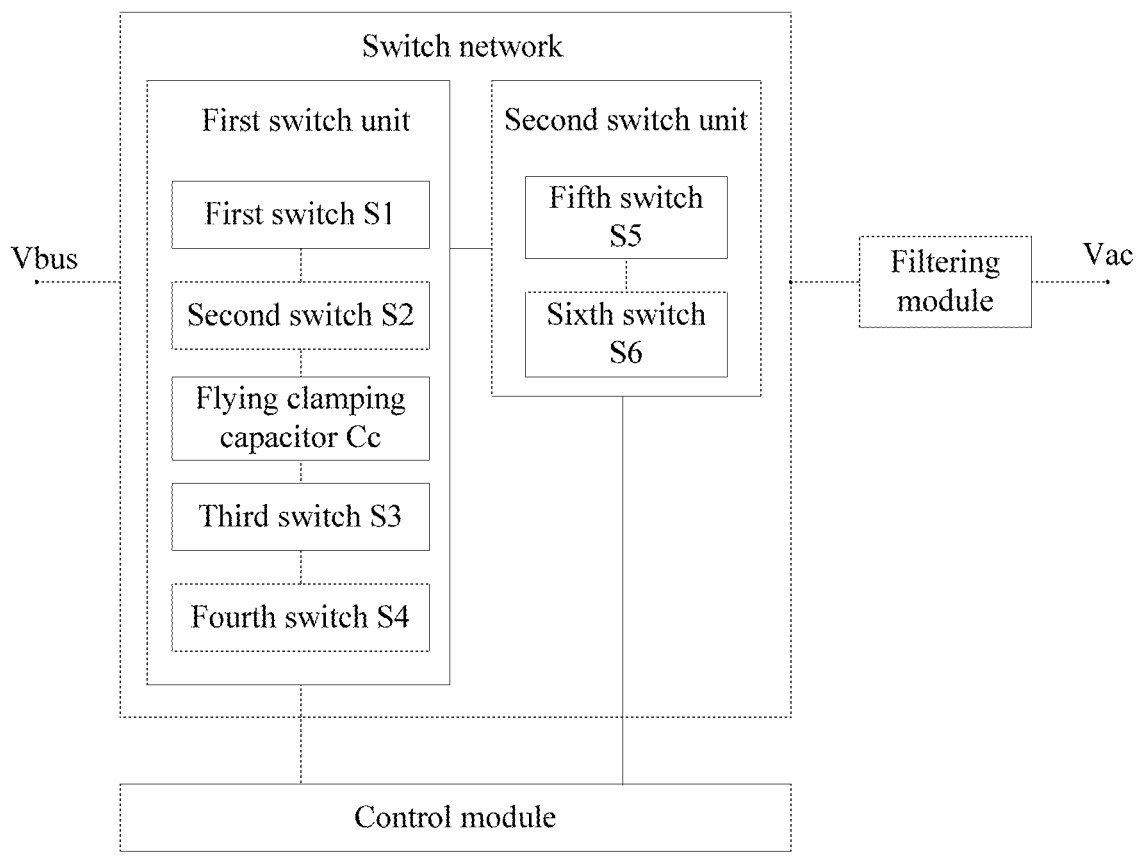
FIG. 6a is a schematic structural diagram of a conversion circuit according to this application.
Figure 6B:
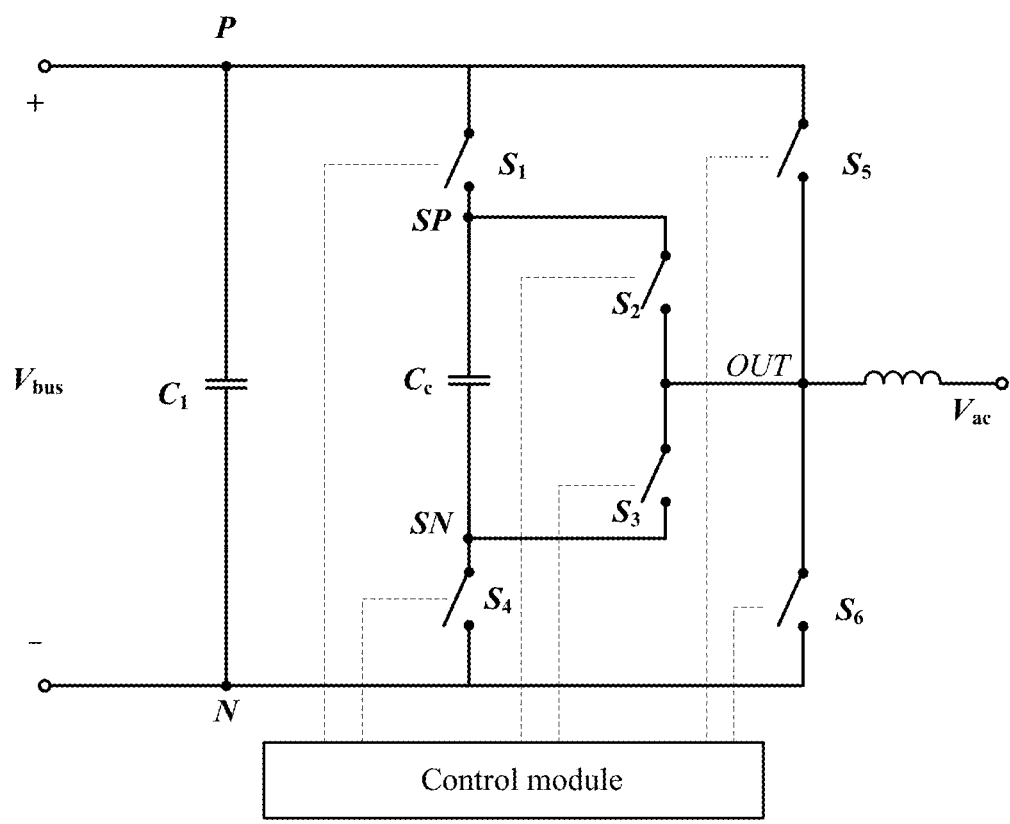
FIG. 6b is a schematic structural diagram of another conversion circuit according to this application.
Figure 6C:
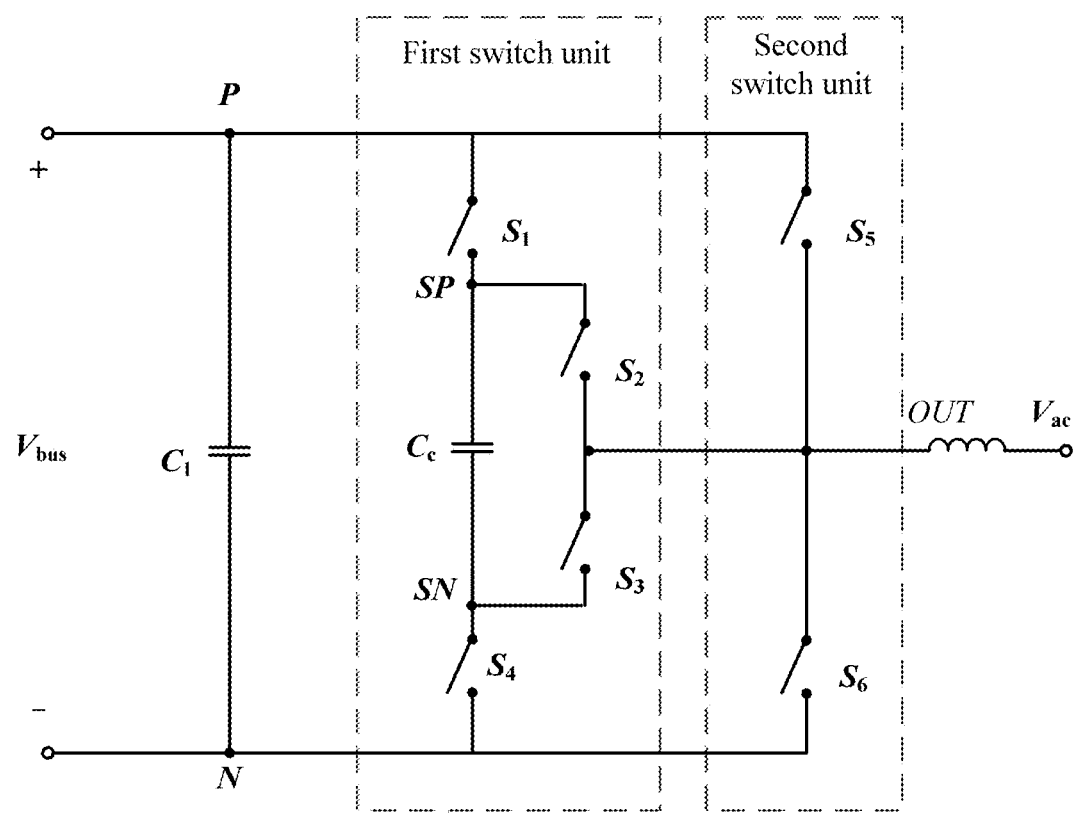
FIG. 6c is a schematic structural diagram of still another conversion circuit according to this application.

FIG. 6a to FIG. 6c are schematic structural diagrams of a conversion circuit according to this embodiment of the present disclosure. The circuit includes an input terminal, an output terminal, a control module, and a switch network formed by semiconductor switching devices. The switch network includes a first switch unit and a second switch unit.

As shown in FIG. 6b or FIG. 6c, the input terminal includes a positive direct current bus terminal and a negative direct current bus terminal, and the output terminal includes an alternating current output end; the first switch unit includes a first switch S1, a second switch S2, a third switch S3, a fourth switch S4, and a flying clamping capacitor Cc; further, the first switch S1, the second switch S2, the third switch S3, the fourth switch S4 are connected in series to form a first converter bridge arm, where two ends of the first converter bridge arm are respectively connected to the positive direct current bus terminal P and the negative direct current bus terminal N, a first end of the flying clamping capacitor Cc is connected to a series connection point SP between the first switch S1 and the second switch S2, a second end of the flying clamping capacitor Cc is connected to a series connection point SN between the third switch S3 and the fourth switch S4, and a series connection point between the second switch S2 and the third switch S3 forms an output end of the first switch unit.

A first end of the first switch S1 is connected to the positive direct current bus terminal P; the other end of the first switch S1 is connected to one end of the second switch S2; and a junction point is SP. The other end of the second switch S2 is connected to one end of the third switch S3, and a junction point is an output end OUT of the switch network. The other end of the third switch S3 is connected to one end of the fourth switch S4, and a junction point is SN. The other end of the fourth switch S4 is connected to the negative direct current bus terminal N, and the first end of the flying clamping capacitor Cc is connected to SP and the other end of the flying clamping capacitor Cc is connected to SN. In this way, voltage clamping of the switch devices S2 and S3 is implemented. The flying clamping capacitor Cc is configured to implement voltage clamping of the switch devices S2 and S3, to avoid overvoltage damage of the foregoing devices.

The second switch unit includes a fifth switch S5 and a sixth switch S6, where the fifth switch S5 and the sixth switch S6 form a second converter bridge arm; two ends of the second converter bridge arm are respectively connected to the positive direct current bus terminal P and the negative direct current bus terminal N, and a series connection point between the fifth switch S5 and the sixth switch S6 is connected to an output end of the second switch unit.

The output end OUT of the first switch unit and the second switch unit is connected to the alternating current output end Vac.

The first switch unit and the second switch unit are connected to the control module, and perform power conversion between a direct current voltage and an alternating current voltage under control of the control module, and the switch devices are controlled by the control module according to a preset time sequence, so as to implement electric energy conversion between a direct current and an alternating current.

In the circuit provided in this embodiment, to implement voltage balancing of the switch devices in the first switch unit and optimal control of converter performance, a steady-state voltage of the flying clamping capacitor is usually controlled at ½ of a direct current bus voltage, that is, Vbus/2. In this case, based on driving logic, output levels of the output end OUT of the first switch unit and the second switch unit relative to a direct current bus midpoint M are +Vbus/2, 0, and −Vbus/2.

Optionally, during an actual control process, the control module may perform fine adjustment on the steady-state voltage of the flying clamping capacitor based on an actual application situation. In addition, the control module includes a control circuit, a controller, or the like.

Optionally, based on a direct current input voltage Vbus, a withstand voltage value of each switch device (for example, the first switch S1 to the fourth switch S4) in the first switch unit is not smaller than Vbus/2, and a withstand voltage value of each switch device (for example, the fifth switch S5 and the sixth switch S6) in the second switch unit is not smaller than Vbus.

For a converter application in which a maximum direct current input voltage Vbus is 1 kV, optionally, a selectable withstand voltage value of each of the switch devices S1 to S4 in the first switch unit is 600 V or 650 V, and a selectable withstand voltage value of each of the fifth switch S5 and the sixth switch S6 in the second switch unit is 1200 V.

The circuit provided in this embodiment can comprehensively use a low conduction loss of a two-level inverter circuit and a low switching loss of a multilevel inverter circuit, and can significantly reduce a loss of a converter by controlling switch-on/off time sequences of the switch devices in the first switch unit and the switch devices in the first switch unit. Within a time in which both the first switch S1 and the second switch S2 are on, that is, when the output end OUT of the first switch unit and the second switch unit is connected to the positive direct current bus terminal P, the fifth switch S5 is controlled to be on for at least a period of time; and within a time in which both the third switch S3 and the fourth switch S4 are on, that is, when the output end OUT is connected to the negative direct current bus terminal N, the sixth switch S6 is controlled to be on for at least a period of time. Because an on-state voltage drop of the fifth switch S5 is lower than a voltage drop obtained after the first switch S1 and the second switch S2 are connected in series, and an on-state voltage drop of the sixth switch S6 is lower than a voltage drop obtained after the third switch S3 and the fourth switch S4 are connected in series, switch-on of the fifth switch S5 and the sixth switch S6 may cause a decrease in a conduction loss of the converter.

In addition, the control module controls a switch on/off moment of a switch device in the second switch unit to be later than or earlier than a switch on/off moment of a switch device in the first switch unit, so as to implement transient commutation in power conversion by using the first switch unit. Because S1 to S4 are low-voltage devices and have excellent switching characteristics and low switching losses, switch-on/off commutation implemented by using S1 to S4 can cause a decrease in a switching loss of the converter, and implement zero voltage switch-on and switch-off of the switch devices in the second switch unit.

Optionally, the circuit further includes a filtering module, configured to filter out a ripple in a voltage of the output end OUT of the first switch unit and the second switch unit, one end of the filtering module is connected to the output end OUT, and the other end of the filtering module is connected to the alternating current output end. The filtering module includes a filter circuit, and the filter circuit may be an inductor L.

Optionally, the fifth switch S5 and the sixth switch S6 have no switching loss. Therefore, to reduce the conduction loss of the converter, S5 and S6 may be switch devices with low conduction voltage drops in an actual application.

Optionally, switching cycles of the four switches (S1 to S4) in the first switch unit are the same, and a switching frequency of each of the four switches is a high frequency; the first switch S1 and the fourth switch S4 are complementary switches; and the second switch S2 and the third switch S3 are complementary switches. The high frequency means that a switching frequency is at a kilohertz (kHz) level, for example, several kHz, dozens of kHz, or hundreds of kHz. A value of a switching frequency of each switch is not specifically limited in this embodiment.

Further, the first switch S1 and the second switch S2 in the first switch unit are switched on/off with a phase shift of 180°, and the third switch S3 and the fourth switch S4 are switched on/off with a phase shift of 180°. In an actual application, to implement steady-state voltage control of the flying clamping capacitor, the phase shift angle between the first switch and the second switch and the phase shift angle between the third switch and the fourth switch are not strictly fixed at 180°, but fluctuate near 180°.

It should be noted that, each switch in the first switch unit and the second switch unit may be one switch, and may alternatively include a switch device formed by a plurality of switches. In this embodiment, the switches (including S1 to S6) in the switch units each include an insulated gate bipolar transistor (IGBT) (T1 to T6) and an anti-parallel diode (D1 to D6) of the IGBT. In addition, the first switch, the second switch, the third switch, the fourth switch, the fifth switch, and the sixth switch may alternatively be metal-oxide semiconductor field-effect transistor (MOSFET) devices.

Figure 7:
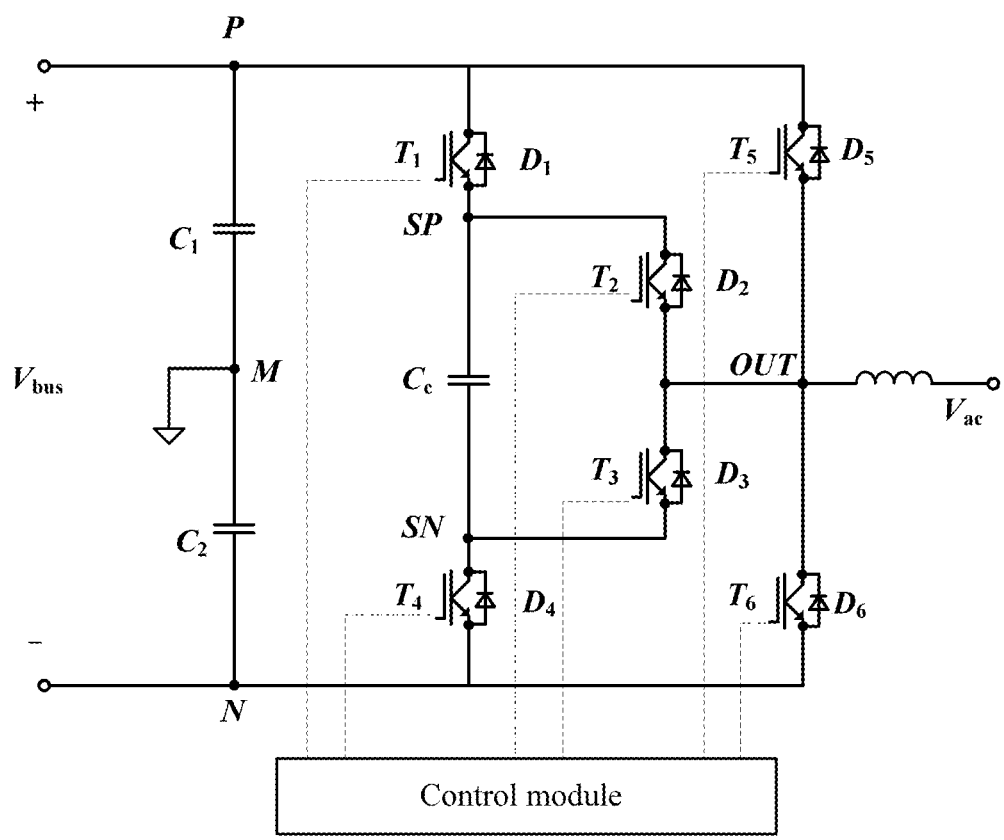
FIG. 7 is a topological diagram of a circuit in which a direct current bus uses capacitors connected in series to virtualize a reference potential according to this application.
Figure 8:
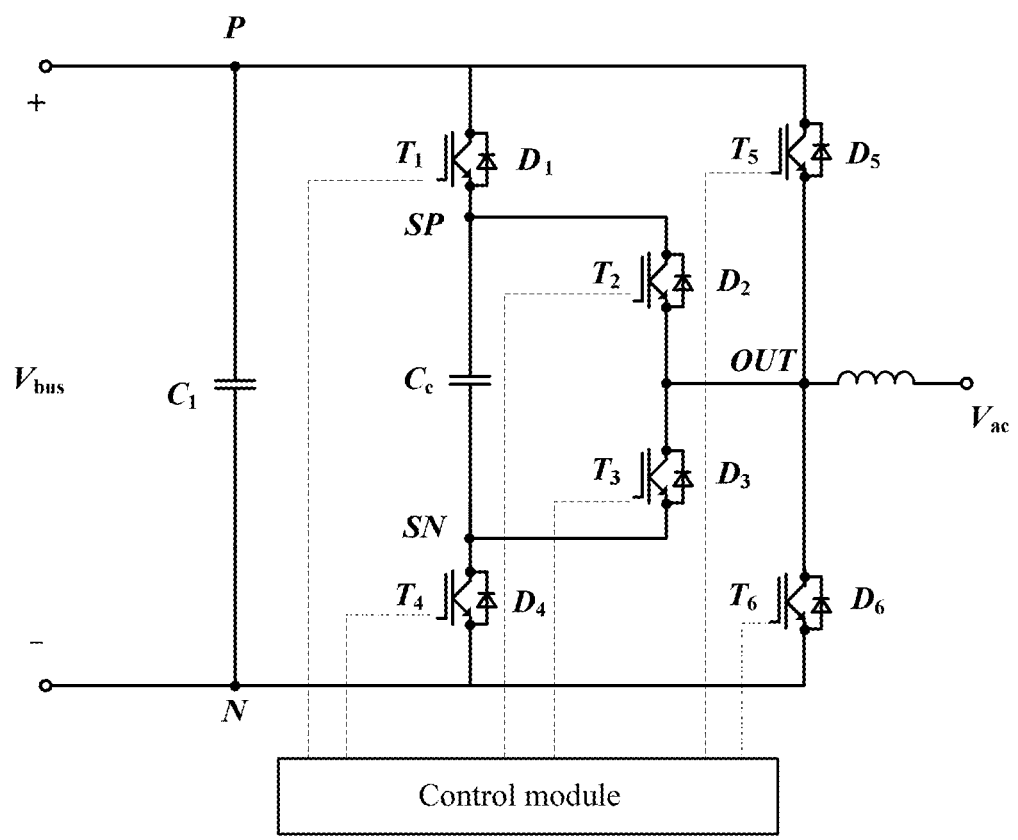
FIG. 8 is a topological diagram of a circuit in which a direct current bus capacitor uses a single capacitor according to this application.

As shown in FIG. 7 and FIG. 8, a topology of the circuit includes a switch network, a direct current bus capacitor, a flying clamping capacitor, an output filter inductor, and a control module. The switch network includes two switch units: a first switch unit and a second switch unit. The first switch unit includes a first switch (T1&D1), a second switch (T2&D2), a third switch (T3&D3), a fourth switch (T4&D4), and the flying clamping capacitor Cc, and the second switch unit includes a fifth switch (T5&D6) and a sixth switch (T6&D6).

In the first switch unit, the first switch, the second switch, the third switch, and the fourth switch are connected in series to form a first converter bridge arm; a first end of the first switch is connected to a positive direct current bus terminal P, the other end of the first switch is connected to the second switch, and a junction point is SP. A junction point of the second switch and the third switch forms an output end of the first switch unit, the other end of the third switch is connected to one end of the fourth switch, and a junction point is SN. The other end of the fourth switch is connected to a negative direct current bus terminal N, and a first end of the flying clamping capacitor is connected to SP and the other end of the flying clamping capacitor is connected to SN. In the second switch unit, the fifth switch and the sixth switch are connected in series to form a second converter bridge arm; a first end of the fifth switch is connected to the positive direct current bus terminal P, the other end of the fifth switch is connected to one end of the sixth switch, and a junction point is an output end of the second switch unit; and the other end of the sixth switch is connected to the negative direct current bus terminal N.

The direct current bus capacitor may be formed by connecting a capacitor C1 and a capacitor C2 in series, as shown in FIG. 7; or the direct current bus capacitor may be directly implemented by a single high-voltage capacitor C1, as shown in FIG. 8. For convenience of description, in embodiments of this application, an example in which the capacitor C1 and the capacitor C2 are connected in series to form the bus capacitor is used, and a reference potential is virtualized, that is, a voltage of a point M shown in FIG. 7.

A control method is further provided in an embodiment, and is used to control the foregoing conversion circuits shown in FIG. 6, FIG. 7, and FIG. 8.

Figure 9:
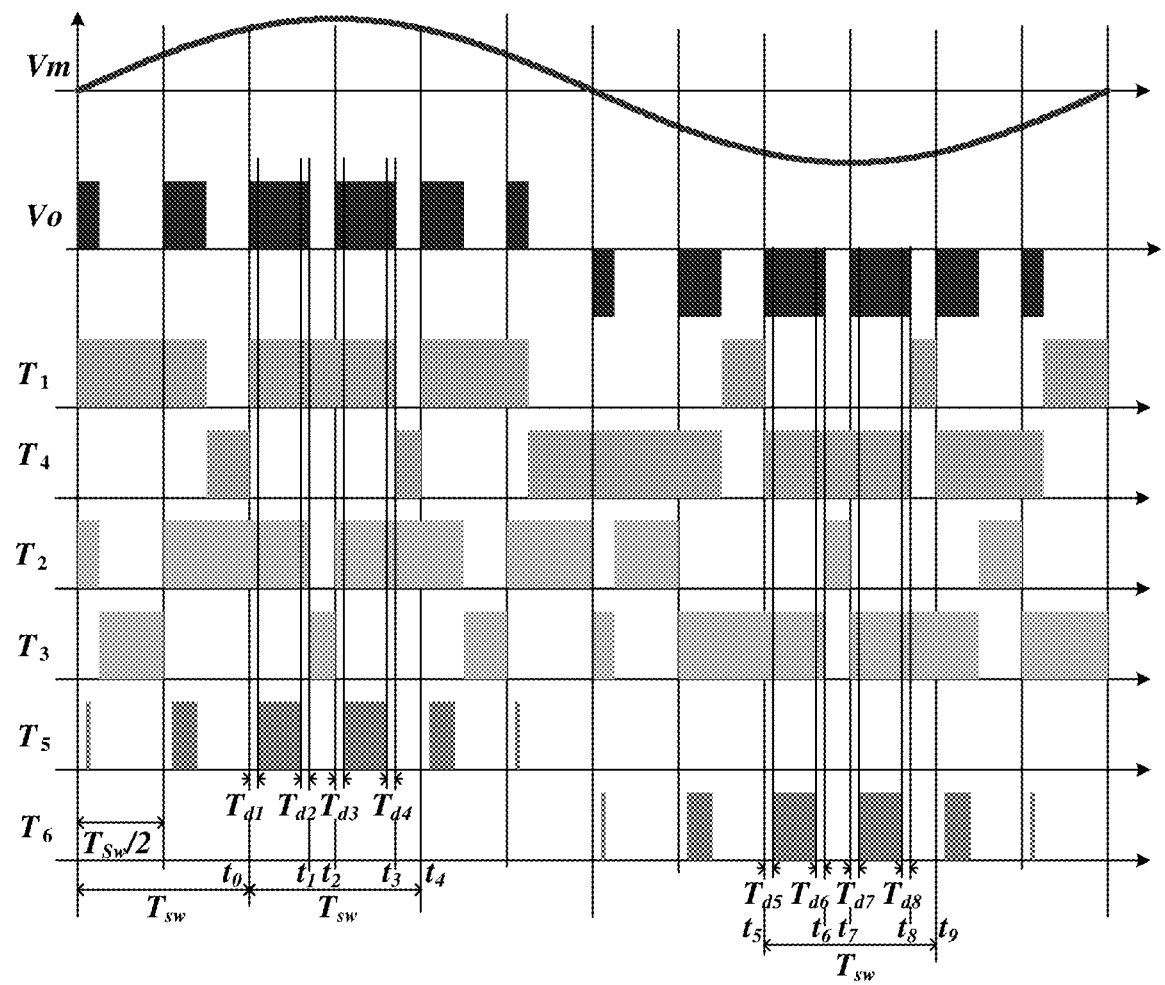
FIG. 9 is a time sequence diagram of driving logic of switch devices in a conversion circuit according to this application.

To describe in detail the control method provided in this embodiment, FIG. 9 is a time sequence diagram of driving logic of switch devices in the conversion circuit. In a converter control process, a common technology is used for dead-time control between complementary switch tubes in a converter bridge arm, and therefore in the time sequence diagram shown in FIG. 9, a dead time between the complementary switch devices in the converter bridge arm is not considered, but only a schematic diagram of a drive waveform is shown.

As shown in FIG. 9, in the first switch unit, a switching cycle of each switch device is Tsw, and a pulse width is obtained by the control module based on input and output conditions through pulse width modulation (PWM), where the first switch T1 and the fourth switch T4 are complementary switches; the second switch T2 and the third switch T3 are complementary switches; the first switch T1 and the second switch T2 are switched on/off with a phase shift of 180°; and the third switch T3 and the fourth switch T4 are switched on/off with a phase shift of 180°. Different from the first switch unit, the fifth switch T5 and the sixth switch T6 in the second switch unit are non-complementary switches, and T5 and T6 are determined, based on a time sequence of the switch devices in the first switch unit, to switched be on or off.

In FIG. 9, Vm represents a modulation voltage obtained by the control module based on feedback quantity such as an alternating current output end voltage, an inductor current, a direct current bus voltage, and an external command. Vo represents a voltage of the output end OUT of the first switch unit and the second switch unit (or referred to as the switch network) in the circuit; and for both the foregoing voltages, a voltage of a direct current bus midpoint M as a reference potential.

In the method provided in this embodiment, the control module controls each switch device in the first switch unit to perform pulse width modulation, so that the output end of the switch network outputs a required alternating current voltage, such as a high frequency impulse voltage. Further, the control module controls each switch device in the second switch unit to cooperate in switching on or off each switch device in the first switch unit. A specific control process is as follows:

Within a time in which both the first switch and the second switch are on, that is, when the output end OUT of the switch network is connected to the positive direct current bus terminal P, the control module controls the fifth switch S5 to be on for at least a period of time; and within a time in which both the third switch and the fourth switch are on, that is, when the output end OUT of the switch network is connected to the negative direct current bus terminal N, the control module controls the sixth switch to be on for at least a period of time.

Because an on-state voltage drop of the fifth switch is lower than a voltage drop obtained after the first switch and the second switch are connected in series, an on-state voltage drop of the sixth switch is lower than a voltage drop obtained after the third switch and the fourth switch are connected in series, switch-on of the fifth switch and the sixth switch may cause a decrease in a conduction voltage drop in a current flowing loop, thereby reducing a conduction loss of a converter.

Optionally, to fully use the first switch unit to reduce a switching loss of the converter, when the output end of the switch network is connected to the positive direct current bus terminal, that is, when the output end of the switch network outputs a level Vbus/2, the control module controls the fifth switch T5 to be switched on a period of time later than the first switch T1 or the second switch T2, and the first switch T1 or the second switch T2 is used to implement switching-on commutation; and when the output end of the switch network is connected to the positive direct current bus terminal or the negative direct current bus terminal through the flying clamping capacitor, that is, when the output end OUT of the switch network outputs a level 0, the control module controls the fifth switch T5 to be switched off a period of time earlier than the first switch T1 or the second switch T2, and the first switch T1 or the second switch T2 is used to implement switching-off commutation.

Similarly, when the output end of the switch network is connected to the negative direct current bus terminal, that is, when the output end of the switch network outputs a level −Vbus/2, the control module controls the sixth switch T6 to be switched on a period of time later than the first switch T3 or the second switch T4, and the third switch T3 or the fourth switch T4 is used to implement switching-on commutation; and when the output end of the switch network is connected to the positive direct current bus terminal or the negative direct current bus terminal through the flying clamping capacitor, that is, when the output end OUT of the switch network outputs a level 0, the control module controls the sixth switch T6 to be switched off a period of time earlier than the first switch T3 or the second switch T4, and the third switch T3 or the fourth switch T4 is used to implement switching-off commutation.

In this method, because the switch devices in the first switch unit are low-voltage devices and have excellent switching characteristics and low switching losses, the low-voltage devices may be used to implement commutation, thereby reducing the switching loss of the converter.

In a specific embodiment, a switch-on/off time sequence of a switch device in the second switch unit is described by using a switch time sequence of the fifth switch T5 as an example. The control method includes the following:

As shown in FIG. 9, in a positive half cycle of a modulation voltage, when the first switch T1 is off and the second switch T2 is on, when the first switch T1 is switched on at a moment t0, that is, an output voltage of the switch network jumps from a zero voltage to Vbus/2, the control module controls the fifth switch T5 to be switched on a time interval Td1 later than the moment t0. The first switch T1 has completed switching-on commutation at the moment t0, a voltage between two ends of the fifth switch is zero, and therefore zero voltage switch-on can be implemented by switching on the fifth switch T5 a time interval later, so that T5 has no switching-on loss. After T5 is switched on, because a voltage drop of T5 is lower than a voltage drop obtained after T1 and T2 are connected in series, a load current mainly flows through T5, thereby reducing the conduction loss of the converter.

When both the first switch T1 and the second switch T2 are on, when the second switch T2 is to be switched off at a moment t1, the control module controls the fifth switch T5 to be switched off a time interval Td2 earlier than the moment t1, so as to switch a load current to the first switch unit. In this way, T2 is used to implement switching-off commutation and implement zero voltage switch-off of the fifth switch T5, so that T5 has no switching-off loss. In an actual control process, the control module may calculate the switch-off moment of the second switch T2 at least one switching cycle in advance, so that a switch-off moment of T5 can be obtained based on the switch-off moment of T2 and the time interval Td2 with which switching-off is performed earlier before the switch-off moment of T2.

When the first switch is on and the second switch is off, when the second switch T2 is switched on at a moment t2, the control module controls the fifth switch T5 to be switched on a time interval Td3 later than the moment t2. In this way, T2 is used to implement switching-on commutation and implement zero voltage switch-on of the fifth switch T5, so that T5 has no switching-on loss.

When both the first switch and the second switch are on, when the first switch is to be switched off at a moment t3, the control module controls the fifth switch T5 to be switched off a time interval Td4 earlier than the moment t3. In this way, T1 is used to implement switching-off commutation and implement zero voltage switch-off of the fifth switch T5, so that T5 has no switching-off loss. In an actual control process, the control module may calculate the switch-off moment of the first switch T1 at least one switching cycle in advance, so that a switch-off moment of T5 can be obtained based on the switch-off moment of T1 and the time interval Td2 with which switching-off is performed earlier before the switch-off moment of T1.

When time sequence control described above is performed, T5 can implement zero voltage switch-on and switch-off and has no switching loss, and main switching losses occur on T1 and T2. T1 and T2 are low-voltage devices and have low switching losses, and therefore the switching loss of the converter can be reduced in the foregoing manner.

A time interval with which the fifth switch T5 is switched on later than the first switch T1 or the second switch T2 and a time interval with which the fifth switch T5 is switched off earlier than the first switch T1 or the second switch T2 may be determined on the basis of switching characteristics of the switch devices in the first switch unit and the second switch unit, such as a current rise time and a current fall time. Optionally, the time interval may be set solely by the control module. Generally, the time interval is between several nanoseconds and several microseconds. For example, the time interval is any value between 0 ns and 10 vs.

Similarly, in a negative half cycle of the modulation voltage, a switch-on/off time sequence of the sixth switch T6 is equivalent to that of the fifth switch T5, and the switch time sequence of the sixth switch T6 is determined by the third switch T3 and the fourth switch T4.

When the third switch T3 is on and the fourth switch T4 is off, when the fourth switch T4 is switched on at a moment t5, the control module controls the sixth switch T6 to be switched on a time interval Td5 later than the switch-on moment t5 of the fourth switch T4. In this way, the fourth switch T4 is used to implement switching-on commutation and implement zero voltage switch-on of T6, so that T6 has no switching-on loss.

When both the third switch T3 and the fourth switch T4 are on, when the third switch T3 is to be switched off at a moment t6, the control module controls the sixth switch T6 to be switched off a time interval Td6 earlier than the switch-off moment t6 of the third switch T3, so as to switch a load current to the first switch unit. In this way, T3 is used to implement switching-off commutation and implement zero voltage switch-off of T6, so that T6 has no switching-off loss.

When the third switch T3 is off and the fourth switch T4 is on, when the third switch T3 is switched on at a moment t7, the control module controls the sixth switch T6 to be switched on a time interval Td7 later than the switch-on moment t7 of the third switch T3. In this way, T3 is used to implement switching-on commutation and implement zero voltage switch-on of T6, so that T6 has no switching-on loss.

when both the third switch T3 and the fourth switch T4 are on, when the fourth switch T4 is to be switched off at a moment t8, the control module controls the sixth switch T6 to be switched off a time interval Td8 earlier than the switch-off moment t8 of the fourth switch T4. In this way, T4 is used to implement switching-off commutation and implement zero voltage switch-off of T6, so that T6 has no switching-off loss.

When time sequence control described above is performed, T6 can implement zero voltage switch-on and switch-off and has no switching loss, and main switching losses occur on T3 and T4. T3 and T4 are low-voltage devices and have low switching losses, and therefore the switching loss of the converter can be reduced in the foregoing manner.

It should be noted that, a difference between "switch-on" and "on" of a switch in this embodiment lies in that "switch-on" is mainly for an action performed on the switch and emphasizes a transient state of switching on the switch, and "on" mainly means a steady state of the switch and that the semiconductor switch is in a state of being in a closed circuit.

In the circuit structure and the control method provided in this embodiment, the switching loss of the converter may be reduced by using a flying capacitor three-level circuit topology in combination with low-voltage devices, and the conduction loss of the converter may be reduced by using a conventional bridge-type two-level circuit topology in combination with high-voltage devices.

Compared with a mixed type NPC three-level inverter circuit, in the circuit structure provided in this application, a flying capacitor is used to replace diodes, such as the diode D2 and the diode D3 shown in FIG. 5. This reduces a quantity of semiconductors, and simplifies a circuit structure, facilitating power module layout. In addition, because the flying capacitor is used and there are no diodes D2 and D3, a direct current bus does not need to use a large capacity capacitor for voltage division to generate a midpoint voltage. Therefore, there is no problem of midpoint voltage fluctuation, a direct current bus capacitor structure is simplified, and a bus capacitor is saved.

In addition, in the circuit control method provided in this embodiment, each switch of the first switch unit and the second switch unit is controlled to be switched on or off, so that the output end of the first switch unit and the second switch unit is alternately connected to the positive direct current bus terminal and the negative direct current bus terminal according to a preset switch-on/off time sequence, and commutation is implemented through switch-on or switch-off of the four switches in the first switch unit, and switch-on of the fifth switch and the sixth switch in the second switch unit causes a decrease in the conduction voltage drop of the current flowing loop, thereby reducing the conduction loss of the converter.

Optionally, for an application system in which a maximum direct current input voltage is 1 kV, generally, the switches T1 to T4 and the anti-parallel diodes D1 to D4 in the first switch unit each may be a switch device with a withstand voltage of 600 V or 650 V, and T5, T6, D5, and D5 in the second switch unit each may be a switch device with a withstand voltage of 1200 V. Based on conduction voltage drops and switching loss characteristics, T1 to T4 each may be a device with a low switching loss, and T5 and T6 each may be a device with a low conduction voltage drop.

Embodiment 2

Figure 10:
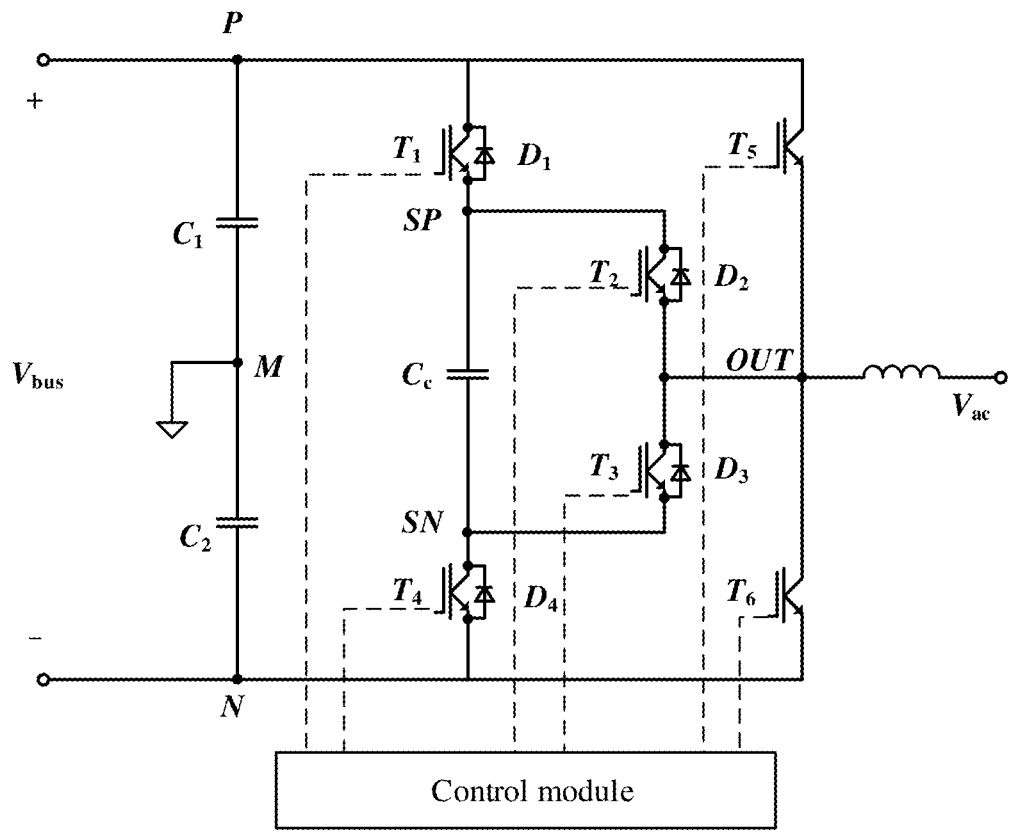
FIG. 10 is a schematic structural diagram of another conversion circuit according to this application.

In a circuit provided in this embodiment, four switch devices in a first switch unit each include an IGBT and an anti-parallel diode D. A difference from Embodiment 1 lies in that a fifth switch T5 and a sixth switch T6 in a second switch unit include only IGBTs (T5 and T6) but include no anti-parallel diode. Other devices and connection relationships are the same as those in Embodiment 1, as shown in FIG. 10.

The circuit includes an input terminal, an output terminal, a control module, and a switch network formed by semiconductor switching devices. The switch network includes two switch units: the first switch unit and the second switch unit. The first switch unit includes a first switch (T1&D1), a second switch (T2&D2), a third switch (T3&D3), a fourth switch (T4&D4), and a flying clamping capacitor Cc, and the second switch unit includes a fifth switch (T5) and a sixth switch (T6). In the first switch unit, the first switch (T1&D1), the second switch (T2&D2), the third switch (T3&D3), and the fourth switch (T4&D4) are connected in series to form a first converter bridge arm; a first end of the first switch is connected to a positive direct current bus terminal P, the other end of the first switch is connected to the second switch, and a junction point is SP. A junction point of the second switch and the third switch forms an output end of the first switch unit, the other end of the third switch is connected to one end of the fourth switch, and a junction point is SN. The other end of the fourth switch is connected to a negative direct current bus terminal N, and a first end of the flying clamping capacitor is connected to SP and the other end of the flying clamping capacitor is connected to SN. In the second switch unit, the fifth switch and the sixth switch are connected in series to form a second converter bridge arm; a first end of the fifth switch is connected to the positive direct current bus terminal P, the other end of the fifth switch is connected to one end of the sixth switch, and a junction point is an output end of the second switch unit; and the other end of the sixth switch is connected to the negative direct current bus terminal N. A filtering module includes an inductor, located between an output end OUT of the first switch unit and the second switch unit and an alternating current voltage Vac.

The control module is connected to the first switch unit and the second switch unit, and is configured to control the first switch unit to perform pulse width modulation, so that the output end of the switch network outputs a required alternating current voltage. Further, a control process includes the following: Within a time in which both the first switch and the second switch are on, that is, when the output end of the switch network is connected to the positive direct current bus terminal, the control module controls the fifth switch to be on for at least a period of time. Within a time in which both the third switch and the fourth switch are on, that is, when the output end of the switch network is connected to the negative direct current bus terminal, the control module controls the sixth switch to be on for at least a period of time. A process in which the control module controls the second switch unit to cooperate in switching on or off each switch in the first switch unit is the same as that in the method of the foregoing specific embodiment, and details are not repeated in this embodiment.

Compared with the circuit structure in Embodiment 1, a switch tube in the second switch unit in this embodiment includes no anti-parallel diode, and only the diodes in the first switch unit are used for freewheeling, thereby making a commutation loop structure simpler and facilitating module layout and circuit control.

Embodiment 3

Figure 11:
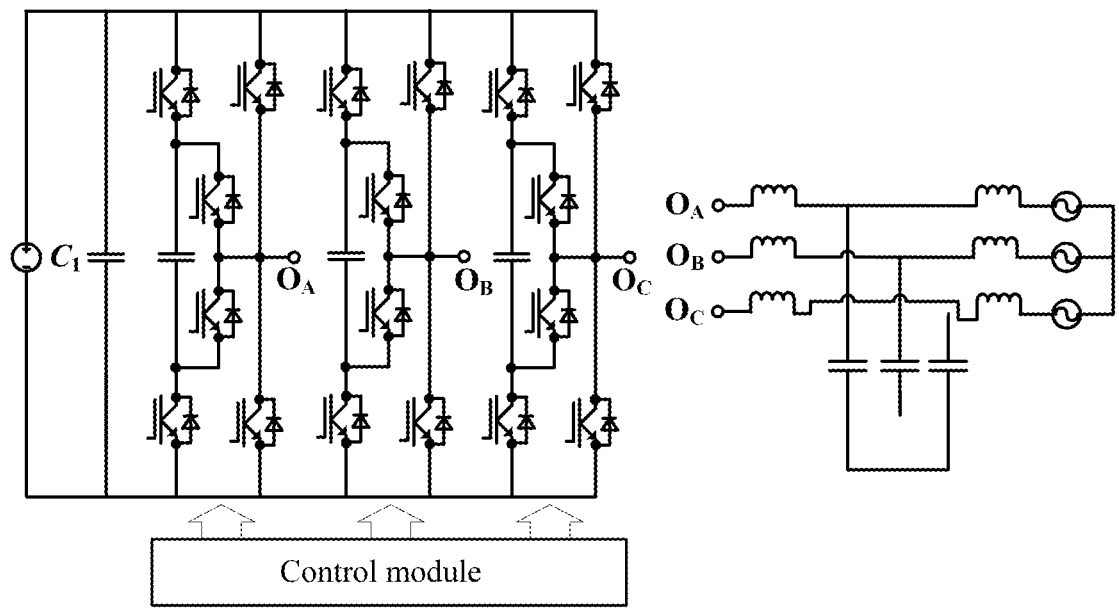
FIG. 11 is a schematic structural diagram of a three-phase inverter circuit based on a conversion circuit according to this application.

FIG. 11 shows a form of a three-phase inverter circuit based on a circuit topology provided in Embodiment 1, and the circuit includes a direct current source, an alternating current source, an inverter circuit, a filtering module, and a control module.

To implement electric energy conversion between the direct current source and the alternating current source, each phase circuit is formed by the circuit provided in Embodiment 1, and energy conversion between a three-phase alternating current and a three-phase direct current can be implemented by using the control module.

A composition structure of each phase circuit and the control method performed by the control module are the same as those in Embodiment 1, and details are not repeated in this embodiment.

It should be noted that, the conversion circuits provided in the foregoing Embodiment 1 and Embodiment 2 each are a single-phase circuit or a part of a single-phase circuit, and the circuit in Embodiment 3 is a three-phase circuit or a part of a three-phase circuit. In addition, the circuit in Embodiment 3 may alternatively be a multi-phase circuit or a constituent part of a multi-phase circuit. This is not limited in this application.

In addition, the conversion circuit in the foregoing embodiments may be a rectifying circuit, an inverter circuit, or a constituent part of a rectifying circuit or an inverter circuit.

In actual hardware implementation, this application further provides a device, where the device includes the conversion circuit in the foregoing embodiments and a control method for the circuit, and is configured to implement power conversion between a direct current voltage and an alternating current voltage.

Further, the device may be a converter, or an AC/DC converter or a DC/AC converter in FIG. 3 or FIG. 4. In addition, the conversion circuit can also be applied to another device or apparatus, and has a function of implementing power conversion between a direct current voltage and an alternating current voltage.

In the foregoing embodiments, the first switch, the second switch, the third switch, and the fourth switch each are a semiconductor switching device such as an IGBT or a MOSFET, and the IGBT includes an anti-parallel diode. The fifth switch and the sixth switch each are a semiconductor switching device such as an IGBT or a MOSFET, and the IGBT may include an anti-parallel diode, or may not include an anti-parallel diode.

In addition, the semiconductor switching device in the switch network may be a separate single-tube device, or a power module that is formed by packaging a switch device wafer, and control logic is implemented by a control chip such as a digital signal processor, a complex programmable logic device, or a digital/analog discrete integrated circuit.

The control module includes a processor. The processor may be a central processing unit (CPU), a digital signal processor (DSP), or another signal processing unit. The processor may further include a hardware chip. The hardware chip may be an application-specific integrated circuit (ASIC), a programmable logic device (PLD), or a combination thereof. The foregoing PLD may be a complex programmable logic device (CPLD), a field-programmable gate array (FPGA), generic array logic (GAL), or any combination thereof.

In a control process of an actual converter application, the control module may calculate a switch-off moment of each switch device in the first switch unit at least one switching cycle in advance, so that a corresponding switch device may be switched off in advance based on the calculated switch-off moment and a time interval with which switch-off is performed earlier before the switch-off moment.

The control module may further include a memory configured to store a control method and strategy of the conversion circuit. Further, the memory may be a magnetic disk, an optical disc, a read-only memory (ROM), a random access memory (RAM), or the like.

In a specific application technology scenario, the conversion circuit and the control method provided in the foregoing embodiments of this application may be applied to a photovoltaic power generation system. Referring to FIG. 4, the photovoltaic power generation system includes a photovoltaic cell, a photovoltaic inverter, and an alternating current power grid, where the photovoltaic inverter includes an input end, an output end, and the conversion circuit provided in any one of the foregoing embodiments. For a structure and a function of the conversion circuit, refer to the foregoing embodiments, and details are not repeated. The input end of the photovoltaic inverter is connected to the photovoltaic cell; the output end of the photovoltaic inverter is connected to the alternating current power grid; and the conversion circuit is configured to convert voltages at the input end and the output end of the photovoltaic inverter.

Optionally, the photovoltaic cell includes a photovoltaic panel, and the photovoltaic inverter may be a DC/AC rectifier or the like.

Optionally, the photovoltaic inverter may further include other auxiliary function modules, such as a monitoring module, a maximum power tracking module, a communications module, a lightning protection module, and a grid-connected module.

Optionally, the photovoltaic power generation system may further include a centralized communications unit, a centralized control unit, or other devices such as an alternating current distribution device and an isolation transformer device, and this is not limited in this application.

A person skilled in the art may clearly understand that, the technologies in the embodiments of the present disclosure may be implemented by software in addition to a necessary general hardware platform. Based on such an understanding, the technical solutions of the present disclosure essentially or the part contributing to the prior art may be implemented in a form of a software product. The software product is stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present disclosure.

Same and similar parts between the various embodiments in this specification can be referred to each other. Especially, the foregoing Embodiment 2 and Embodiment 3 are basically similar to a method embodiment, and therefore is described briefly. For related parts, refer to descriptions in the method embodiment.

The foregoing descriptions are implementation of the present disclosure, but are not intended to limit the protection scope of the present disclosure.

What is claimed is:

1. A conversion circuit, wherein the circuit comprises an input terminal, an output terminal, a control module, and a first switch unit and a second switch unit that are formed by semiconductor switching devices;

the input terminal comprises a positive direct current bus terminal and negative direct current bus terminal, and the output terminal comprises an alternating current output end;

the first switch unit comprises a flying clamping capacitor and a first converter bridge arm that is formed by connecting a first switch, a second switch, a third switch, and a fourth switch in series, wherein two ends of the first converter bridge arm are respectively connected to the positive direct current bus terminal and the negative direct current bus terminal, a first end of the flying clamping capacitor is connected to a series connection point between the first switch and the second switch, a second end of the flying clamping capacitor is connected to a series connection point between the third switch and the fourth switch, and a series connection point between the second switch and the third switch forms an output end of the first switch unit;

the second switch unit comprises a second converter bridge arm that comprises a fifth switch and a sixth switch, two ends of the second converter bridge arm are respectively connected to the positive direct current bus terminal and the negative direct current bus terminal, and a series connection point between the fifth switch and the sixth switch is connected to an output end of the second switch unit;

the output end of the first switch unit and the second switch unit is connected to the alternating current output end; and the first switch unit and the second switch unit are connected to the control module, and switch under control of the control module, so that the conversion circuit converts between a direct current voltage and an alternating current voltage, wherein the control module is configured to:

control within a time in which both the first switch and the second switch are on, the fifth switch to be on for at least a first period of time; and control within a time in which both the third switch and the fourth switch are on, the sixth switch to be on for at least a second period of time, wherein the controlling, by the control module within a time in which both the first switch and the second switch are on, the fifth switch to be on for at least a first period of time comprises:

when the first switch is off and the second switch is on, when the first switch is switched on, controlling, by the control module, the fifth switch to be switched on a time interval Td1 later than a switch-on moment of the first switch;

when both the first switch and the second switch are on, when the second switch is to be switched off, controlling, by the control module the fifth switch to be switched off a time interval Td2 earlier than a switch-off moment of the second switch;

when the first switch is on and the second switch is off, when the second switch is switched on, controlling, by the control module, the fifth switch to be switched on a time interval Td3 later than a switch-on moment of the second switch; and when both the first switch and the second switch are on, when the first switch is to be switched off, controlling, by the control module, the fifth switch to be switched off a time interval Td4 earlier than a switch-off moment of the first switch.

2. The conversion circuit according to claim 1, wherein the circuit further comprises a filtering module; and a first end of the filtering module is connected to the output end of the first switch unit and the second switch unit, and a second end of the filtering module is connected to the alternating current output end.

3. The conversion circuit according to claim 1, wherein the first switch, the second switch, the third switch, the fourth switch, the fifth switch, and the sixth switch each comprise an IGBT that comprises an anti-parallel diode.

4. The conversion circuit according to claim 1, wherein the first switch, the second switch, the third switch, and the fourth switch each comprise an IGBT and an anti-parallel diode, and the fifth switch and the sixth switch each comprise an IGBT.

5. The conversion circuit according to claim 1, wherein the circuit is a part of a single-phase circuit, a three-phase circuit, or a multiphase circuit.

6. The conversion circuit according to claim 1, wherein the circuit is a part of a rectifying circuit or an inverter circuit.

7. A power supply device, wherein the power supply device comprises a conversion circuit, and is configured to implement power conversion between a direct current voltage and an alternating current voltage;
wherein the conversion circuit comprises an input terminal, an output terminal, a control module, and a first switch unit and a second switch unit that are formed by semiconductor switching devices;
the input terminal comprises a positive direct current bus terminal and a negative direct current bus terminal, and the output terminal comprises an alternating current output end;
the first switch unit comprises a flying clamping capacitor and a first converter bridge arm that is formed by connecting a first switch, a second switch, a third switch, and a fourth switch in series, wherein two ends of the first converter bridge arm are respectively connected to the positive direct current bus terminal and the negative direct current bus terminal, a first end of the flying clamping capacitor is connected to a series connection point between the first switch and the second switch, a second end of the flying clamping capacitor is connected to a series connection point between the third switch and the fourth switch, and a series connection point between the second switch and the third switch forms an output end of the first switch unit;
the second switch unit comprises a second converter bridge arm that comprises a fifth switch and a sixth switch, two ends of the second converter bridge arm are respectively connected to the positive direct current bus terminal and the negative direct current bus terminal, and a series connection point between the fifth switch and the sixth switch is connected to an output end of the second switch unit;
the output end of the first switch unit and the second switch unit is connected to the alternating current output end; and
the first switch unit and the second switch unit are connected to the control module, and switch under control of the control module, so that the conversion circuit converts between a direct current voltage and an alternating current voltage, wherein the control module is configured to:
control within a time in which both the first switch and the second switch are on, the fifth switch to be on for at least a first period of time; and
control within a time in which both the third switch and the fourth switch are on, the sixth switch to be on for at least a second period of time, wherein the controlling, by the control module within a time in which both the first switch and the second switch are on, the fifth switch to be on for at least a first period of time comprises:
when the first switch is off and the second switch is on, when the first switch is switched on, controlling, by the control module, the fifth switch to be switched on a time interval Td1 later than a switch-on moment of the first switch;
when both the first switch and the second switch are on, when the second switch is to be switched off, controlling, by the control module the fifth switch to be switched off a time interval Td2 earlier than a switch-off moment of the second switch;
when the first switch is on and the second switch is off, when the second switch is switched on, controlling, by the control module, the fifth switch to be switched on a time interval Td3 later than a switch-on moment of the second switch; and
when both the first switch and the second switch are on, when the first switch is to be switched off, controlling, by the control module, the fifth switch to be switched off a time interval Td4 earlier than a switch-off moment of the first switch.

8. The power supply device according to claim 7, wherein the conversion circuit further comprises a filtering module; and
a first end of the filtering module is connected to the output end of the first switch unit and the second switch unit, and a second end of the filtering module is connected to the alternating current output end.

9. The power supply device according to claim 7, wherein the first switch, the second switch, the third switch, the fourth switch, the fifth switch, and the sixth switch each comprise an IGBT that comprises an anti-parallel diode.

10. The power supply device according to claim 7, wherein
the first switch, the second switch, the third switch, and the fourth switch each comprise an IGBT and an anti-parallel diode, and the fifth switch and the sixth switch each comprise an IGBT.

11. The power supply device according to claim 7, wherein the conversion circuit is a part of a single-phase circuit, a three-phase circuit, or a multiphase circuit.

12. The power supply device according to claim 7, wherein the conversion circuit is a part of a rectifying circuit or an inverter circuit.

13. A photovoltaic power generation system, wherein the system comprises a photovoltaic cell, a photovoltaic inverter, and an alternating current power grid;
the photovoltaic inverter comprises an input end, an output end, and a conversion circuit;
the input end of the photovoltaic inverter is connected to the photovoltaic cell, and the output end of the photovoltaic inverter is connected to the alternating current power grid; and
the conversion circuit is configured to convert voltages at the input end and the output end of the photovoltaic inverter, wherein
the conversion circuit comprises an input terminal, an output terminal, a control module, and a first switch unit and a second switch unit that are formed by semiconductor switching devices;

the input terminal comprises a positive direct current bus terminal and a negative direct current bus terminal, and the output terminal comprises an alternating current output end;

the first switch unit comprises a flying clamping capacitor and a first converter bridge arm that is formed by connecting a first switch, a second switch, a third switch, and a fourth switch in series, wherein two ends of the first converter bridge arm are respectively connected to the positive direct current bus terminal and the negative direct current bus terminal, a first end of the flying clamping capacitor is connected to a series connection point between the first switch and the second switch, a second end of the flying clamping capacitor is connected to a series connection point between the third switch and the fourth switch, and a series connection point between the second switch and the third switch forms an output end of the first switch unit;

the second switch unit comprises a second converter bridge arm that comprises a fifth switch and a sixth switch, two ends of the second converter bridge arm are respectively connected to the positive direct current bus terminal and the negative direct current bus terminal, and a series connection point between the fifth switch and the sixth switch is connected to an output end of the second switch unit;

an output end of the first switch unit and the second switch unit is connected to the alternating current output end; and the first switch unit and the second switch unit are connected to the control module, and switch under control of the control module, so that the conversion circuit converts between a direct current voltage and an alternating current voltage, wherein the control module is configured to:

control within a time in which both the first switch and the second switch are on, the fifth switch to be on for at least a first period of time; and control within a time in which both the third switch and the fourth switch are on, the sixth switch to be on for at least a second period of time, wherein the controlling, by the control module within a time in which both the first switch and the second switch are on, the fifth switch to be on for at least a first period of time comprises:

when the first switch is off and the second switch is on, when the first switch is switched on, controlling, by the control module, the fifth switch to be switched on a time interval Td1 later than a switch-on moment of the first switch;

when both the first switch and the second switch are on, when the second switch is to be switched off, controlling, by the control module the fifth switch to be switched off a time interval Td2 earlier than a switch-off moment of the second switch;

when the first switch is on and the second switch is off, when the second switch is switched on, controlling, by the control module, the fifth switch to be switched on a time interval Td3 later than a switch-on moment of the second switch; and when both the first switch and the second switch are on, when the first switch is to be switched off, controlling, by the control module, the fifth switch to be switched off a time interval Td4 earlier than a switch-off moment of the first switch.

14. The photovoltaic power generation system according to claim 13, wherein the conversion circuit further comprises a filtering module; and a first of the filtering module is connected to the output end of the first switch unit and the second switch unit, and a second end of the filtering module is connected to the alternating current output end.

15. The photovoltaic power generation system according to claim 13, wherein the first switch, the second switch, the third switch, the fourth switch, the fifth switch, and the sixth switch each comprise an IGBT that comprises an anti-parallel diode.

16. The photovoltaic power generation system according to claim 13, wherein the first switch, the second switch, the third switch, and the fourth switch each comprise an IGBT and an anti-parallel diode, and the fifth switch and the sixth switch each comprise an IGBT.

17. The photovoltaic power generation system according to claim 13, wherein the conversion circuit is a part of a single-phase circuit, a three-phase circuit, or a multiphase circuit.

18. The photovoltaic power generation system according to claim 13, wherein the conversion circuit is a part of a rectifying circuit or an inverter circuit.

\* \* \* \* \*